(12) United States Patent
Albert et al.

(10) Patent No.: US 8,489,261 B2
(45) Date of Patent: Jul. 16, 2013

(54) METHOD AND DEVICE FOR AIDING THE PILOTING OF AN AIRCRAFT DURING A FINAL APPROACH PHASE

(75) Inventors: Nicolas Albert, Toulouse (FR); Diane Tambach, Toulouse (FR); Laurent Azoulai, Mondonville (FR); Patrice Rouquette, Pompertuzat (FR)

(73) Assignee: Airbus Operations (SAS), Toulouse Cedex (FR)

( * ) Notice: Subject to any disclaimer, the term of this patent is extended or adjusted under 35 U.S.C. 154(b) by 23 days.

(21) Appl. No.: 13/009,260

(22) Filed: Jan. 19, 2011

(65) Prior Publication Data

US 2011/0184595 A1 Jul. 28, 2011

(30) Foreign Application Priority Data

Jan. 27, 2010 (FR) ...................... 10 00312

(51) Int. Cl.
*G06F 19/00* (2011.01)
*B64F 1/20* (2006.01)
*G01S 19/50* (2010.01)
*G05D 1/12* (2006.01)

(52) U.S. Cl.
USPC ......... 701/16; 340/951; 342/357.33; 244/183

(58) Field of Classification Search
USPC ................ 701/2, 14, 16, 3, 4, 5, 6, 7, 8, 11, 701/12, 15, 17, 18, 468, 528, 529, 539, 10, 701/301, 208, 400; 244/220, 23 A, 23 B, 244/36, 211, 214, 215, 56, 80, 90 R, 90 A, 244/3.19, 3.15, 17.17, 4 R, 81, 75.1, 76 R, 244/174–197; 340/959, 972, 979, 963, 967–970, 340/973, 974, 975, 977, 978, 971, 435, 965, 340/976, 945–951, 960; 342/38, 63, 176, 342/357.2, 357.33, 357.36, 462, 18, 49, 58, 342/83, 81, 84, 87, 157, 199, 357.53, 29, 342/33–35

See application file for complete search history.

(56) References Cited

U.S. PATENT DOCUMENTS

| | | | |
|---|---|---|---|
| 6,856,864 B1 | 2/2005 | Gibs et al. | |
| 2005/0182530 A1* | 8/2005 | Murphy | 701/16 |
| 2007/0129857 A1 | 6/2007 | Fortier | |
| 2007/0225876 A1* | 9/2007 | Caillaud et al. | 701/16 |
| 2008/0150785 A1* | 6/2008 | Markiton et al. | 342/33 |
| 2010/0305786 A1* | 12/2010 | Boorman | 701/16 |

OTHER PUBLICATIONS

French Republic Institut National De La Propriete Industrielle, Preliminary Search Report, FR 1000312, Sep. 6, 2010.
Wikipedia: "Instrument Approach," Jan. 26, 2010, XP-002599350.

\* cited by examiner

*Primary Examiner* — Muhammad Shafi
(74) *Attorney, Agent, or Firm* — Wood, Herron & Evans, LLP

(57) ABSTRACT

A device for aiding the piloting of an aircraft during a final approach phase includes a flight management system and an approach selecting device for automatically selecting an approach to be used during landing of the aircraft. A method for aiding the piloting of an aircraft includes automatically selecting an approach to be used during landing of an aircraft by selecting an approach with the smallest decision height that can also be technically implemented by the aircraft.

12 Claims, 1 Drawing Sheet

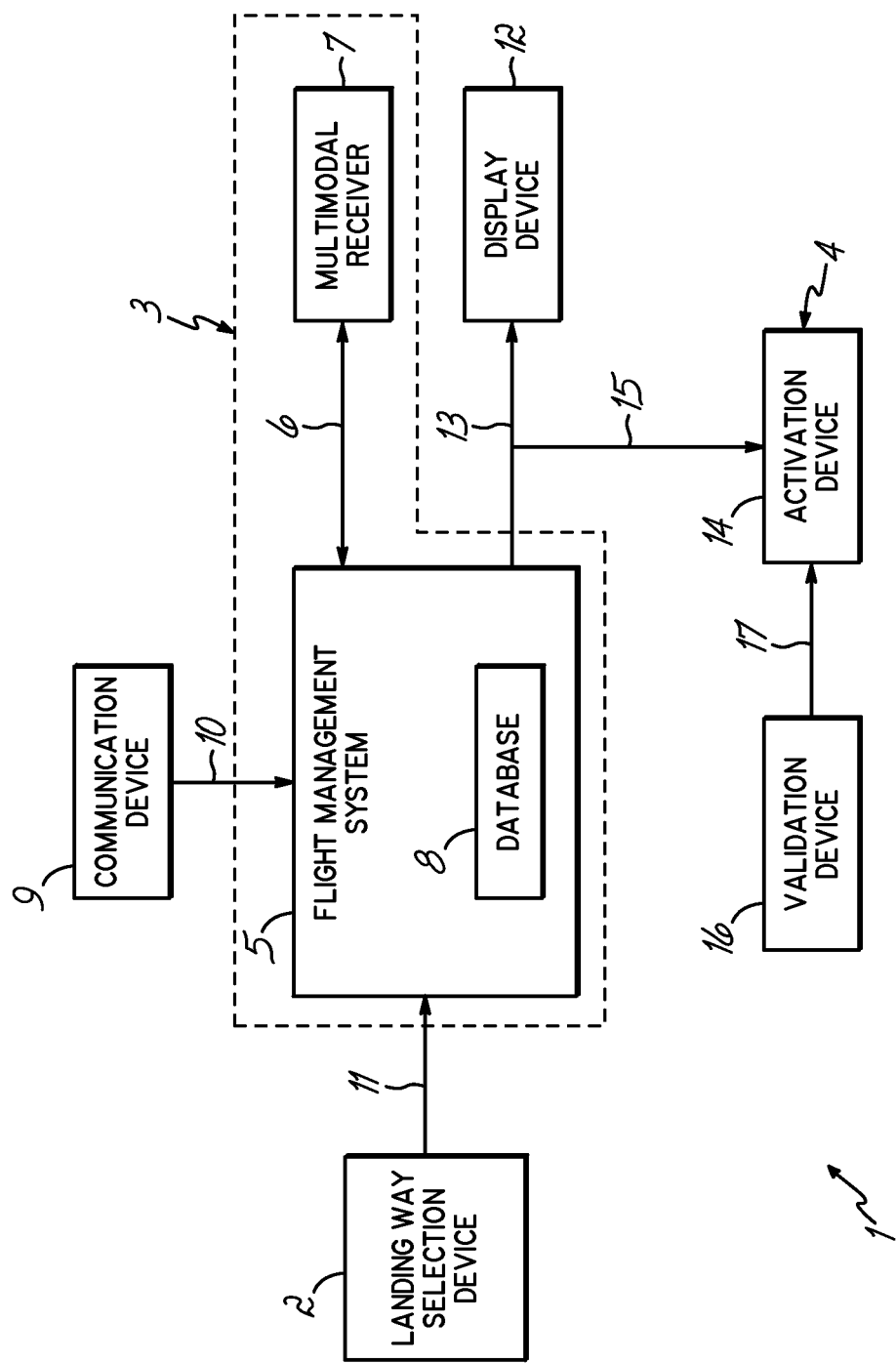

METHOD AND DEVICE FOR AIDING THE PILOTING OF AN AIRCRAFT DURING A FINAL APPROACH PHASE

TECHNICAL FIELD

The present invention relates to a method and a device for aiding the piloting of an aircraft, particularly a transport aircraft, during an approach final phase for the landing on an airport.

BACKGROUND

To implement an approach final phase on an airport, the crew of an aircraft, particularly of a transport aircraft, has to indicate to the on-board systems the particular final approach that has to be followed, amongst a plurality of different approaches being possible. The cockpits of the aircrafts include a flight management system, of the <<FMS>> (<<Flight Management System>>) type, that represents a man-machine interface generally allowing the crew to select the final approach. When such selection is performed, the on-board systems automatically coordinate to allow the aircraft to fly according to the selected final approach.

It is known that the air-traffic controllers can recommend a specific approach, particularly that use the most efficient approach aid means provided on board the aircraft or the one that is available according to planned maintenance and traffic actions, as well as meteorology. The pilot can select an approach different from that recommended, for instance if an on-board equipment the use of which is necessary for this recommended approach is out of service or if he/she wants to train him/herself to perform an other approach (with the proviso that the meteorological conditions allow it).

To select a final approach, the crew has to consult the usual approach charts (paper or electronic format). On these approach charts, the final approaches are characterized by their type (precision, no precision), the guiding device being used, and the minimal decision heights being allowed. The selection of a final approach also relies on the aircraft ability to technically implement such approach, including the equipment provided on board the aircraft and their running state.

Thus, the aircraft crew selects the final approach based on the approach charts they have in their possession, on the information given by the air-traffic controller and on the state of the on-board systems, as well as on weather, which results in an important workload. With the increasing use of GNSS (<<Global Navigation Satellite System>> technologies) such as the GPS constellation and the Galileo constellation, as well as their increases such as the SBAS, GBAS or ABAS systems, as defined by the appendix 10 OACI (International Civil Aviation Organisation) in the field of the aeronautic navigation and the arrival of new technologies as a MLS system, the number of possible approaches is still growing.

Within the scope of the present invention, the following precision approach procedures can for instance be taken into account:
- an instrument approach procedure, relating to an instrument landing system, for instance of the ILS (<<Instrument Landing System>>) type, such as described for instance in patent FR-2,852,685;
- an instrument approach procedure, relating to a microwave landing system, for instance of the MLS (<<Microwave Landing System>>) type; and
- an instrument approach procedure, relating to a GPS (<<Global Positioning System>>) landing system of the GLS (<<GBAS Landing System>>) type.

Moreover, a non precision approach procedure of the RNAV type can be flown with either the SLS (<<Satellite Landing System>>) or FLS (<<FMS Landing System>>) function. The FLS function is for instance described in patents FR-2,852,683, FR-2,852,684 and FR-2,852,686.

The final approach selection thus requires from the crew to perform a number of actions, the number of which grows, as the number of available approaches on a ground increases, which induces a growing workload.

The present invention aims to overcome such drawbacks. It relates to a method for aiding the piloting of an aircraft during an approach final phase, which allows the workload of the aircraft crew to be reduced and to bring at least a partial automation and thus to favourably act on the aircraft safety.

SUMMARY OF THE INVENTION

To this end, according to the invention, the method aids the piloting of an aircraft during the approach final phase for a landing on an airport, the approach final phase being implemented according to one of a plurality of different approaches, to each one of which a particular decision height is associated, is remarkable in that:
  a) a landing way selection device for allowing a member of the crew to select a landing way of the airport, that will be used upon the landing is provided;
  b) among the possible approaches, one approach for landing on the selected landing way, which is technically adapted to be implemented by the aircraft, namely the one presenting the lowest decision height, is automatically selected; and
  c) the thus selected approach for the activation of an approach which will effectively be implemented by the aircraft is used.

Thus, thanks to the invention, an approach among the possible approaches for landing on a previously selected way is automatically selected. This allows for the workload of the crew to be considerably reduced during the approach phase and also to increase the safety at the aircraft level.

To perform such automatic selection, the characteristics of the existing approaches that are contained in a database and more precisely of those that are likely to be implemented for the selected landing way are taken into account. Advantageously, to check if an approach is technically adapted to be implemented, it is checked:
  if a detection device likely to detect signals that have to be used during this approach is available on board the aircraft and is in operational condition; and
  if such detection device suitably detects the signals.

The selection according to the invention is performed by taking into account the decision height for each one of the concerned approaches. In the scope of the present invention, <<decision height>> means the height to the ground, from which the decision has to be taken latest, upon a descent, to perform or to stop the landing phase. At the decision height, the crew of the aircraft has to visually acquire the landing way. In such a case, the landing is ended in visual mode, with a manual guiding. The final guiding can also be performed automatically. In contrast, if at this decision height, the crew does not see the landing way, a go-around has to be performed so as to rise the aircraft up to a safety altitude.

The automatic selection implemented at step b) can be performed in different ways, including according to the taking into account or not of a recommended approach by Air Traffic Control ATC.

Without any recommendation of the Air Traffic Control, or without any taking into account of an existing recommendation, for instance two different variations of implementation can be provided. In a first variation of implementation, at step b):

b1) from a database containing the characteristics of the existing approaches, those that are associated to the selected landing way are extracted;

b2) among these extracted approaches, the one presenting the lowest decision height is selected; and b3) it is checked if the approach selected at step b2) can be technically implemented by the aircraft, and if so, this approach is considered as representing said selected approach, whereas on the contrary if not, said steps b2) and b3) are repeated for the approach presenting the immediately higher decision height, these steps b2) and b3) being repeated in an ascending order of decision height until a selected approach likely to be implemented, representing then said selected approach is obtained.

Furthermore, in a second variation of implementation, at step b):

from a database containing the characteristics of the existing approaches are extracted those being associated to the selected landing way;

among those extracted approaches, all those that can technically be implemented by the aircraft are checked; and among the extracted approaches likely to be implemented is selected that presenting the lowest decision height.

Furthermore, by taking into account a recommendation from the air traffic control, the automatic selection can also be implemented in two different ways.

In a first variation of implementation, at step b):

a communication device for receiving from an air-traffic controller a recommended approach is provided;

from a database containing the characteristics of the existing approaches, those that are associated to the selected landing way are extracted and the approaches are sorted out by growing decision height, placing the recommended approach overhead of this sorting; and in this sorting is selected the first approach likely to be technically implemented by the aircraft.

Furthermore, in a second variation of implementation, at step b):

a communication device for receiving from an air-traffic controller a recommended approach is provided;

from a database containing the characteristics of the existing approaches are extracted those being associated to the selected landing way;

among those extracted approaches, all those that can technically be implemented by the aircraft are checked;

if the recommended approach can be technically implemented, this latter is selected;

otherwise, among the extracted approaches likely to be implemented is selected that presenting the lowest decision height.

Furthermore, the activation implemented at step c) can also be performed in different ways, for instance:

by automatically activating the approach selected at step b);

by presenting the approach selected at step b) to a crew member of the aircraft, and by providing a validation device allowing this crew member to manually validate this approach; and by presenting approaches to a crew member of the aircraft, and with a display device allowing this crew member to select manually an approach.

Furthermore, if two approaches can both be technically implemented and present the same decision height, the selection of the approach can be based:

either on an arbitrary choice decided by the airline; or on a theoretical availability relating to the approach type; or on a piece of information indicating that one of those two approaches is not operating.

Furthermore, at step b), a sorting can be performed according to, moreover, at least one of the following criteria:

the type of approach: precision approach, non precision approach;

the approach method: MLS, ILS, GLS, SLS, FLS.

The present invention also relates to a device for aiding the piloting of an aircraft, particularly a transport aircraft, during an approach final phase for the landing on an airport.

According to this invention, the device includes:

a landing way selection device for allowing a crew member of the aircraft to select a landing way of the airport that will be used during the landing;

a flight management system for selecting automatically, amongst the possible approaches, one approach for landing on said selected landing way, which is technically adapted to be implemented by the aircraft, that is the one presenting the lowest decision height; and an activation device for using the thus selected approach for activating one approach which will effectively be implemented by the aircraft.

The present invention can also relate to an aircraft, in particular a transport airplane, comprising a device for aiding the piloting, such as that above-mentioned.

BRIEF DESCRIPTION OF THE DRAWINGS

The sole FIGURE of the appended drawing will better explain how this invention could be implemented.

This sole FIGURE is the block diagram of a device for aiding the piloting of an aircraft, according to the invention.

DETAILED DESCRIPTION

The device 1 according to the invention and schematically represented on the FIGURE aims at aiding the piloting of an aircraft (not illustrated), particularly a transport aircraft during the approach final phase for a landing on an airport.

This approach final phase has to be implemented, in a usual way, according to one of a plurality of different approaches, to each one of which is associated a particular decision height. <<Decision height>> means the height to the ground, from which the decision has to be taken latest (upon a descent) to continue the procedure and perform a landing or to stop the landing phase. From this decision height, the landing is performed manually by the pilot who sees the landing way. The final guiding can also be performed automatically. During a precision approach with instruments for instance, flight meteorological conditions with instruments are switched to visual flight meteorological conditions, at said decision height (or above such decision height).

According to the invention, the device 1 which is on board the aircraft, includes:

a landing way selection device 2, for instance a keyboard and/or a mouse associated to a monitor that allow a crew member of the aircraft to select a landing way of the airport, that is the way that the crew wants to use upon the landing;

an approach selecting device 3 for automatically selecting, amongst the possible approaches, one approach for the landing on said selected landing way (with the aid of the landing way selection device 2), that is generally an approach:

which presents the lowest decision height; and
which is technically likely to be implemented by the aircraft; and a device 4 for using the thus selected approach for activating one approach which will effectively be implemented by the aircraft, as indicated hereinafter.

Thus, the approach selecting device 3 of the device 1 according to the invention automatically select one approach among the possible approaches, for a landing on a way previously selected by a crew member. This process allows to considerably reduce the workload of the crew during the approach phase and to increase the safety at the aircraft level.

According to the invention, the approach selecting device 3 includes at least:

a flight management system 5 of the FMS type, which is intended to perform the automatic selection by being in relationship, as illustrated, by a link 6, with a multimodal receiver 7; and the multimodal receiver 7 of the MMR (<<Multi-Mode Receiver>>) mode, which are able to check if one given approach is technically likely to be implemented by the aircraft.

To be sure that one approach is technically likely to be implemented, the multimodal receiver 7 checks, for instance:

if usual detection devices likely to detect signals which have to be used during this approach, are available on board the aircraft and are in operational condition; and if these detection devices suitably detect said signals, that is, particularly that said signals are effectively transmitted.

The flight management system 5 includes for instance one database 8, either embedded or independent, which contains the characteristics of the existing approaches, that is particularly:

the type of approach: precision approach (flight with instruments) or non precision approach;

the usual guiding device used for the approach: MLS, ILS, GLS, SLS, FLS; and the associated decision height, that is the minimal height allowed to take the landing decision.

The device 1 can also include an auxiliary database containing lists of the landing ways available on airports. Thus, a crew member can select a destination airport, for instance with the aid of the landing way selection device 2. The device 1 thus proposes to the crew, for instance with the aid of the approach selecting device 3, all the landing ways being available on this destination airport so that this crew member can select, with the aid of the landing way selection device 2, the landing way which will be effectively used for landing.

The automatic selection implemented by the approach selecting device 3 can be performed on different ways whether an approach recommended by the air-traffic control is taken into account or not. In a first embodiment, for which a recommended approach (being specified hereunder) is not taken into account, two variations of different implementations are provided.

In a first variation of implementation of this first embodiment:

the flight management system 5 extracts from the database 8 the approaches that are associated to the landing way selected by a crew member by the aid of the landing way selection device 2;

the flight management system 5 selects amongst the thus extracted approaches, that which presents the lowest decision height; and the multimodal receiver 7 checks if the approach which presents the lowest decision height is technically likely to be implemented.

To this end, said multimodal receiver 7 thus checks:

if detection devices likely to detect signals which have to be used during this approach, are available on board the aircraft; and if the detection devices suitably detect said signals.

If this approach cannot be implemented, the flight management system 5 is aware of that and selects the approach having the decision height immediately above the preceding one, then asks again the multimodal receiver 7 concerning the capacity to implement this approach by aircraft, these operations being repeated up to obtaining one approach which is likely to be technically implemented by the aircraft.

Furthermore, in a second variation of implementation of this first embodiment:

the flight management system 5 extracts from the database 8 all the approaches which are associated to the selected landing way (with the aid of the landing way selection device 2) and transmit them to the multimodal receiver 7;

the multimodal receiver 7 checks, among such extracted approaches, all those which can be technically implemented by the aircraft and inform the flight management system 5 about it; and the flight management system 5 selects, among such extracted approaches those which are likely to be implemented, that which present the lowest decision height.

Furthermore, in a second embodiment, one approach recommended by the air traffic control is taken into account. In particular, the air traffic control can recommend one approach using the most efficient approach aid installed on the aircraft or an approach which is available according to planned maintenance actions and traffic, as well as meteorology.

In the scope of the present invention, this recommended approach can be acquired of different ways by the device 1, that is for instance:

by an electronic communication between the ground and the aircraft, which can be automatically taken into account, via a communication device 9 which is linked to the flight management system 5 via a link 10; or by a manual entry through the crew, by means of appropriate means, in particular the landing way selection device 2 which are linked via a link 11 to the flight management system 5; or by the validation through the crew with appropriate means (for instance the landing way selection device 2) of the reception of a piece of information from the ground.

In a first variation of the implementation of this second embodiment:

the flight management system 5 extracts from the database 8 the approaches which are associated to the selected landing way and sorts the approaches by growing precision height by placing the recommended approach, received from one of the above mentioned ways, overhead of a list showing this sorting; and the multimodal receiver 7 checks if the first approach of this list (recommended approach) is likely to be implemented.

If so, the recommended approach shows the selected approach, and if not:

the multimodal receiver 7 checks if the second approach of this list is likely to be implemented; and if this approach cannot be implemented, the flight management system 5 is aware of it and selects the following approach in the list, then asks again the multimodal receiver 7 about the capacity to implement this approach by aircraft, such operations being repeated up to obtaining an approach which is likely to be technically implemented by the aircraft.

Furthermore, in a second variation of implementation of this second embodiment:

the flight management system 5 extracts from the database 8 the approaches that are associated to the selected landing way and informs the multimodal receiver 7 about it; and the multimodal receiver 7 checks among these extracted approaches, all those which can be technically implemented by the aircraft and informs the flight management system 5 about it; and the flight management system 5 selects select as an approach:

this latter, if the recommended approach can be technically implemented;

otherwise, the one among the extracted approaches likely to be implemented presenting the lowest decision height.

Furthermore, whatever the embodiment considered, if two approaches can both be technically implemented on board the aircraft and present the same decision height, the selection of one of the approaches can be based:

either on an arbitrary choice decided by the airline (through a priority order defined by an AMI (Airline Modifiable Information) parameter; or on a theoretical availability relating to the approach type; or on a piece of information, preferably of the NOTAM (NOtification To Air Men) type, via a ground-board communication or a crew manual entry, indicating that one of both approaches is not in operation.

Furthermore, in addition to a sorting according to the decision height, the flight management system 5 can also perform a sorting according to at least one of the following criteria:

the type of approach: precision approach, non precision approach;

the approach device: MLS, ILS, GLS, SLS, FLS.

It should be noticed that the sorting mode to be used can be determined by the airline for instance thanks to an AMI parameter.

The approach selected by the approach selecting device 3 can also be transmitted by the flight management system 5 (via a link 13) to a display device 12 which is intended to present this piece of information to the members of the aircraft crew.

Furthermore, in the scope of the present invention, the activation of an approach can be performed on different ways. The activation of an approach results in the performing of different actions, and including the entry of data concerning the approach in the flight management system so that it can help with the management of this approach, including allowing different systems of the aircraft participating to the approach to coordinate.

It should be noticed that the effective implementation of an activated approach, that is the piloting of the aircraft in accordance with this approach, is performed in a usual way. As a result, it is not further illustrated in the present description.

The device for using the selected approach 4 of the device 1 according to the invention can be formed in order to perform different activation types.

The activation can for instance be automatically effected. In this first implementation, the activation device 14 intended for the activation receives from the flight management system 5, through a link 15, the approach being automatically selected by such flight management system 5, and the activation device 14 automatically activates this selected approach. This first implementation allows highly reduced crew workload, since the selection and the activation are both automatically performed.

It is also contemplated to perform the activation by crew validation, with a validation device 16, linked by a link 17 to the activation device 14. In this second embodiment, several logics can be defined, that is:

the device 1 proposes the selected approach, for instance on the displaying device 12. The pilot can accept or refuse it, through the validation device 16. If he refuses it, the device 1 submits a new proposal to the pilot; or the device 1 proposes the selected approach by the flight management system 5, for instance on the displaying device 12. The pilot can accept or refuse this proposal with the aid of the validation device 16. If he refuses it, the device 1 proposes all the approaches likely to be implemented, classified by growing decision height; or the device 1 proposes all the approaches likely to be implemented, for instance on the displaying device 12, classified by growing decision height (with the overhead recommended approach, the case being), letting the pilot decide and activate the approach he desires, for instance with the help of the validation device 16.

When several approaches are proposed to the crew, they are presented on monitors, in particular from the displaying device 12, and are preferably sorted according to a sorting order selected by the airline, through for instance an AMI parameter. It is also contemplated, in particular for airports having a great number of different approaches, to gather the proposed approaches by type (precision approach, non precision approach) or by approach device (MLS, ILS, GLS, SLS, FLS, . . . ).

In this second embodiment, the final decision concerning the choice of the approach to be activated always pertains to the crew of the aircraft, which can thus activate a different approach from that selected by the approach selecting device 3.

It should be noticed that the activation of the approach is generally performed in the flight management system 5 of the aircraft, so that the activation device 14 and the validation device 16 are part of the flight management system 5.

The invention claimed is:

1. A method for aiding the piloting of an aircraft during an approach final phase for a landing at an airport, the approach final phase being implemented according to one of a plurality of different approaches, each approach defining a decision height, the method comprising, the following steps carried out by a flight management system on the aircraft and devices connected to the flight management system:

allowing a crew member to select a landing way of the airport that will be used during the landing;

extracting the possible approaches for the selected landing way from a database, the extracted possible approaches including predetermined characteristics for the possible approaches, including the decision height defined by each of the possible approaches;

automatically selecting an approach for the landing on the selected landing way, wherein the automatically selected approach is selected from amongst the number of possible approaches for the selected landing way, wherein the selected approach (i) presents the lowest decision height of possible approaches; and (ii) is technically capable of being implemented by the aircraft, wherein the determining of whether a selected approach is technically capable of being implemented further includes checking if a detection device likely to detect signals that have to be used during the selected approach is available on board the aircraft, and checking if this detection device is suitably detecting the signals; and using the automatically selected approach to activate an approach which will effectively be implemented by the aircraft.

2. The method according to claim 1, wherein automatically selecting the approach for the landing further comprises:

selecting an approach that presents the lowest decision height from among the possible approaches;

checking the aircraft equipment to verify that the selected approach can be technically implemented by the aircraft; and when the selected approach cannot be technically implemented by the aircraft, repeating the selecting and checking steps in an ascending order of decision height until a selected approach can be technically implemented.

3. The method according to claim 1, wherein automatically selecting the approach for the landing further comprises:

initially selecting each of the possible approaches that can technically be implemented by the aircraft; and finally selecting an approach that presents the lowest decision height from the initially selected approaches that can be technically implemented.

4. The method according to claim 1, wherein automatically selecting the approach for the landing further comprises:

receiving a recommended approach from an air traffic controller via a communication device;

sorting the possible approaches into a list in which the approaches have increasing decision heights and the recommended approach is placed at the beginning of the list; and finally selecting a first approach in the list that can be technically implemented by the aircraft.

5. The method according to claim 1, wherein automatically selecting the approach for the landing further comprises:

receiving a recommended approach from an air traffic controller via a communication device;

initially selecting each of the possible approaches that can technically be implemented by the aircraft;

when the recommended approach can be technically implemented by the aircraft, finally selecting the recommended approach; and when the recommended approach cannot be technically implemented by the aircraft, finally selecting an approach that presents the lowest decision height from the initially selected approaches.

6. The method according to claim 1, wherein using the selected approach further comprises:

automatically implementing the selected approach.

7. The method according to claim 1, wherein using the selected approach further comprises:

presenting the selected approach to a member of the aircraft crew for validation with a validation device; and implementing the selected approach if the member validates the selected approach.

8. The method according to claim 1, wherein using the selected approach further comprises:

presenting a plurality of selected approaches to a member of the aircraft crew with a validation device; and implementing a manually validated approach when the member selects one of the plurality of selected approaches.

9. The method according to claim 1, wherein automatically selecting the approach for the landing further comprises:

sorting the possible approaches for the selected landing way according to at least one of the following criteria:

the type of approach; or the approach device.

10. A device for aiding the piloting of an aircraft during an approach final phase for a landing at an airport, the approach final phase being implemented according to one of a plurality of different approaches, each approach defining a decision height, the device comprising:

a first means for allowing a crew member to select a landing way of the airport that will be used upon landing;

a database containing characteristics of a plurality of possible approaches for the selected landing way, including the decision height for each of the possible approaches such that the characteristics may be extracted from the database for all possible approaches;

a second means for automatically selecting among the possible approaches, an approach for the landing on said selected landing way, that is generally an approach:

which is technically capable of being implemented by the aircraft; and which presents the lowest decision height, wherein said second means includes means for checking if a detection device likely to detect signals that have to be used during this approach, is available on board the aircraft and if this detection device is suitably detecting said signals; and a third means for using the selected approach for activating one approach which will effectively be implemented by the aircraft.

11. A device for aiding the piloting of an aircraft during a final approach phase for a landing at an airport, the final approach phase being implemented according to one of a plurality of different approaches, each approach defining a decision height, the device comprising:

a landing way selection device allowing a crew member to select a landing way of the airport that will be used upon landing;

a database containing a plurality of approach charts for the selected landing way, the characteristics of each approach for the selected landing way being extracted in response to the selection of the landing way, including a predetermined, fixed decision height associated with each approach for the selected landing way;

an approach selecting device for automatically selecting an approach for the landing from among possible approaches for the selected landing way, wherein the selected approach is technically capable of being implemented by the aircraft, and presents the lowest decision height of the possible approaches; and an activation device for using the selected approach in the aircraft, wherein checking if the selected approach is technically capable of being implemented by the aircraft includes checking if a detection device likely to detect signals that have to be used during the selected approach is available on board the aircraft, and checking if this detection device is suitably detecting the signals.

12. A method for aiding the piloting of an aircraft during a final approach phase for a landing on an airport, the final approach phase being implemented according to one of a plurality of different approaches, each approach defining a decision height, the method comprising, the following steps carried out by a flight management system on the aircraft and devices connected to the flight management system:

receiving a selection of a landing way of the airport that will be used during the landing;

initially extracting the possible approaches for the selected landing way from a database containing a plurality of approach charts for the selected landing way, the extracted possible approaches including predetermined characteristics including a fixed decision height associated with each possible approach for the selected landing way;

automatically selecting an approach for the landing on the selected landing way with an approach selecting device, by (i) receiving a recommended approach from an air traffic controller; (ii) sorting the possible approaches into a list in which the approaches have increasing decision heights and the recommended approach is placed at the beginning of the list; and (iii) finally selecting a first approach in the list that is capable of being technically implemented by the aircraft; and using the selected approach with an activation device, wherein checking if the selected approach is technically capable of being implemented by the aircraft includes checking if a detection device likely to detect signals that have to be used during the selected approach is available on board the aircraft, and checking if this detection device is suitably detecting the signals.

* * * * *